(12) United States Patent
Kalwitz

(10) Patent No.: US 10,310,980 B2
(45) Date of Patent: Jun. 4, 2019

(54) PREFETCH COMMAND OPTIMIZATION FOR TIERED STORAGE SYSTEMS

(71) Applicant: Seagate Technology LLC, Cupertino, CA (US)

(72) Inventor: George Alexander Kalwitz, Mead, CO (US)

(73) Assignee: Seagate Technology LLC, Cupertino, CA (US)

( * ) Notice: Subject to any disclaimer, the term of this patent is extended or adjusted under 35 U.S.C. 154(b) by 260 days.

(21) Appl. No.: 15/088,169

(22) Filed: Apr. 1, 2016

(65) Prior Publication Data

US 2017/0286305 A1 Oct. 5, 2017

(51) Int. Cl.
*G06F 12/00* (2006.01)
*G06F 12/0862* (2016.01)
*G06F 11/20* (2006.01)

(52) U.S. Cl.
CPC ...... *G06F 12/0862* (2013.01); *G06F 11/2094* (2013.01); *G06F 2201/805* (2013.01); *G06F 2212/1021* (2013.01); *G06F 2212/283* (2013.01)

(58) Field of Classification Search
CPC ............. G06F 12/0862; G06F 11/2094; G06F 2201/805; G06F 2212/1021
See application file for complete search history.

(56) References Cited

U.S. PATENT DOCUMENTS

| | | | |
|---|---|---|---|
| 5,761,464 A | 6/1998 | Hopkins | |
| 5,809,560 A | 9/1998 | Schneider | |
| 6,138,213 A | 10/2000 | Mcminn | |
| 6,219,760 B1 | 4/2001 | Mcminn | |
| 6,292,871 B1* | 9/2001 | Fuente | G06F 12/0862 711/128 |
| 7,238,218 B2 | 7/2007 | Hepner et al. | |
| 7,277,991 B2 | 10/2007 | Day, III et al. | |
| 7,644,204 B2 | 1/2010 | Marripudi et al. | |
| 8,140,769 B2 | 3/2012 | Luttrell | |
| 8,275,829 B2 | 9/2012 | Plamondon | |
| 8,281,078 B2 | 10/2012 | Gendler | |
| 8,719,362 B2 | 5/2014 | Wu et al. | |
| 8,732,355 B1 | 5/2014 | Chan et al. | |
| 8,850,116 B2 | 9/2014 | Spry | |
| 2006/0265568 A1* | 11/2006 | Burton | G06F 12/0862 711/216 |
| 2008/0229070 A1* | 9/2008 | Charra | G06F 9/383 712/207 |
| 2009/0198748 A1* | 8/2009 | Ash | G06F 3/0611 |
| 2013/0304775 A1* | 11/2013 | Davis | H04L 67/1097 707/827 |
| 2014/0108740 A1 | 4/2014 | Rafacz et al. | |
| 2014/0143492 A1* | 5/2014 | Eckert | G06F 12/0802 711/118 |
| 2015/0032967 A1 | 1/2015 | Udayashankar et al. | |

* cited by examiner

*Primary Examiner* — Gurtej Bansal

(74) *Attorney, Agent, or Firm* — Thomas J. Lavan

(57) ABSTRACT

A system is provided. The system includes a storage controller configured to receive a prefetch command from a host interface. The storage controller includes a read cache memory that stores prefetch data in response to the prefetch command and a plurality of storage tiers coupled to the storage controller and providing the prefetch data. The plurality of storage tiers includes a fastest storage tier that stores the prefetch data if the read cache memory discards the prefetch data after storing the prefetch data.

20 Claims, 10 Drawing Sheets

Fig. 1 Storage System Block Diagram
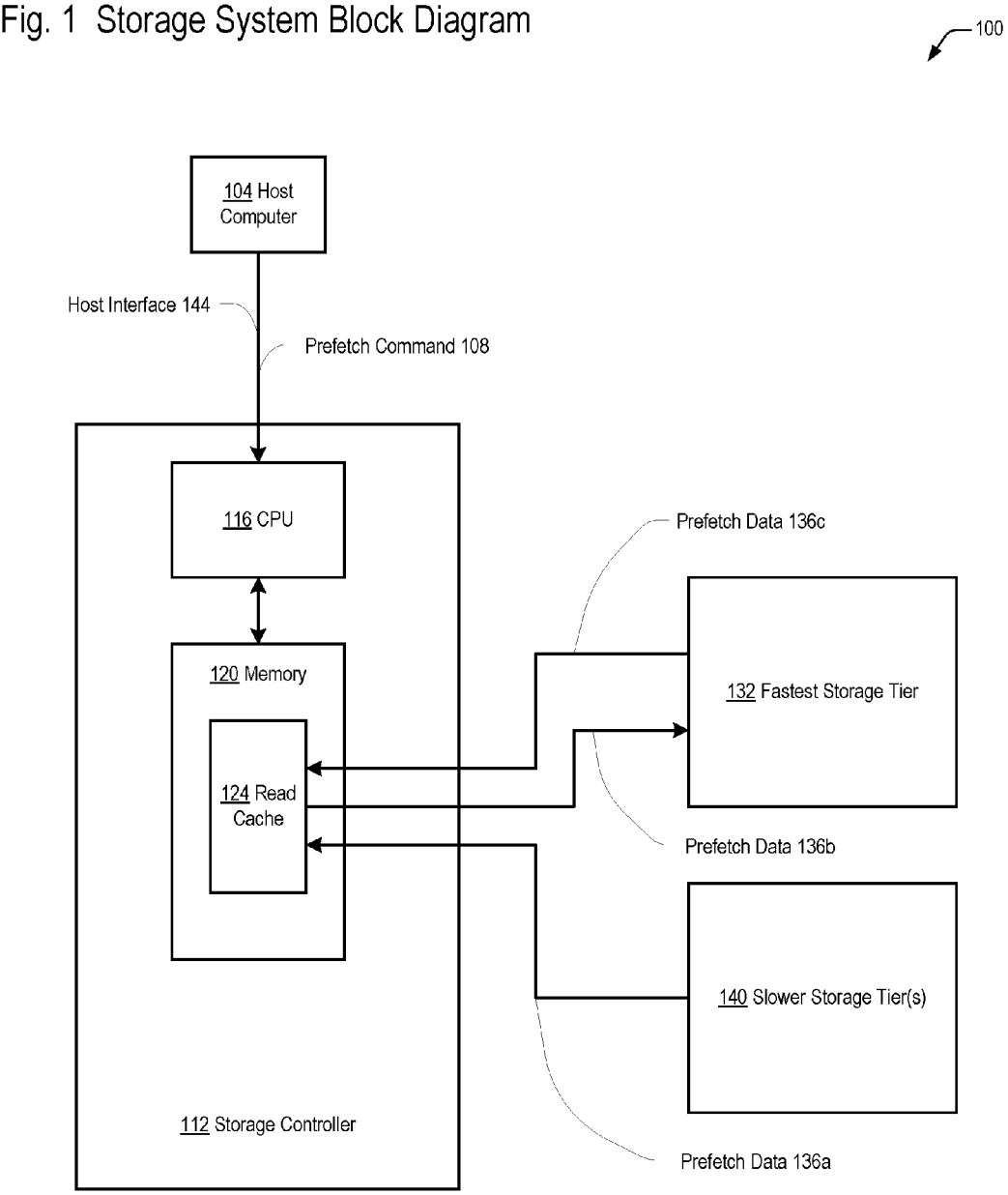

Fig. 2A  Storage System Block Diagram
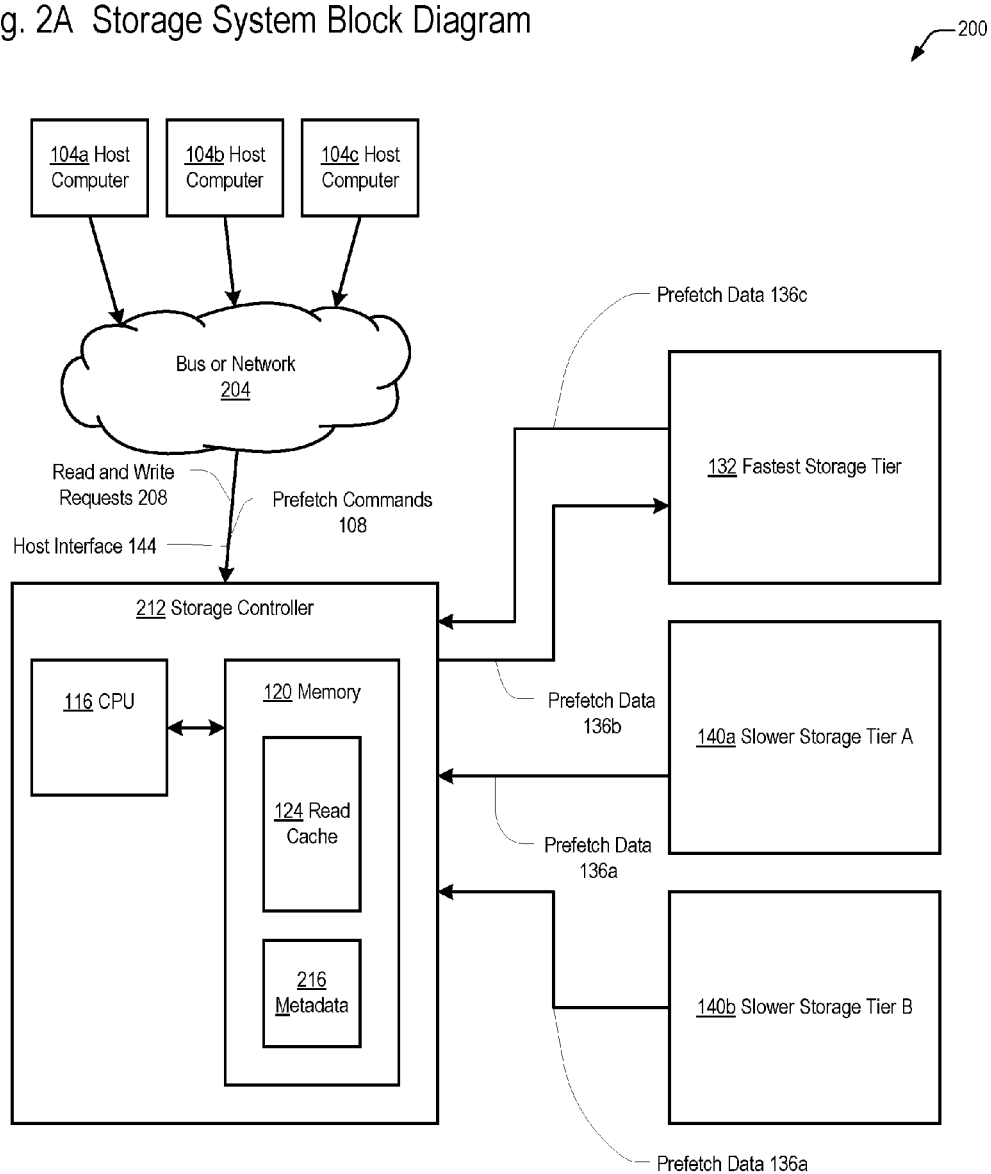

Fig. 2B  Storage System Block Diagram
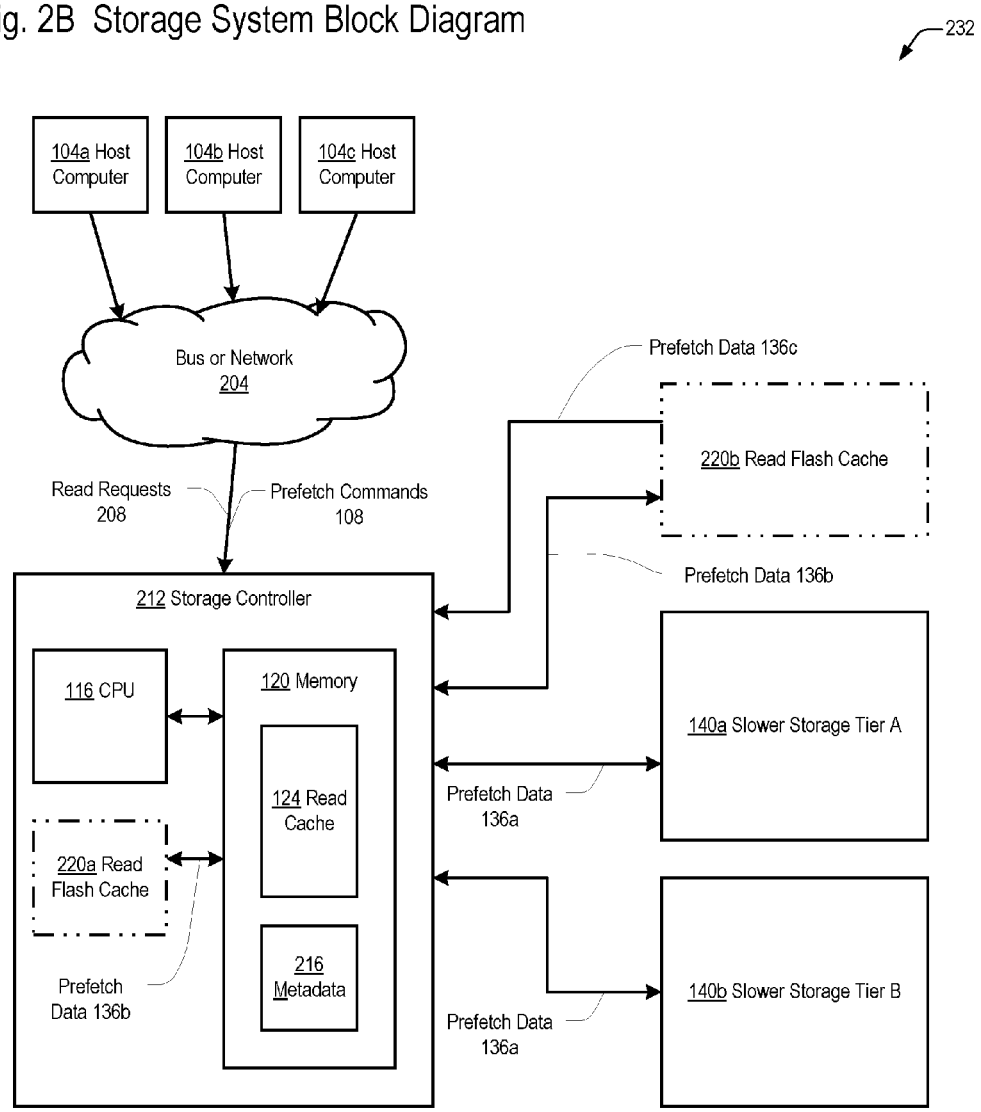

Fig. 3 Read Cache Organization
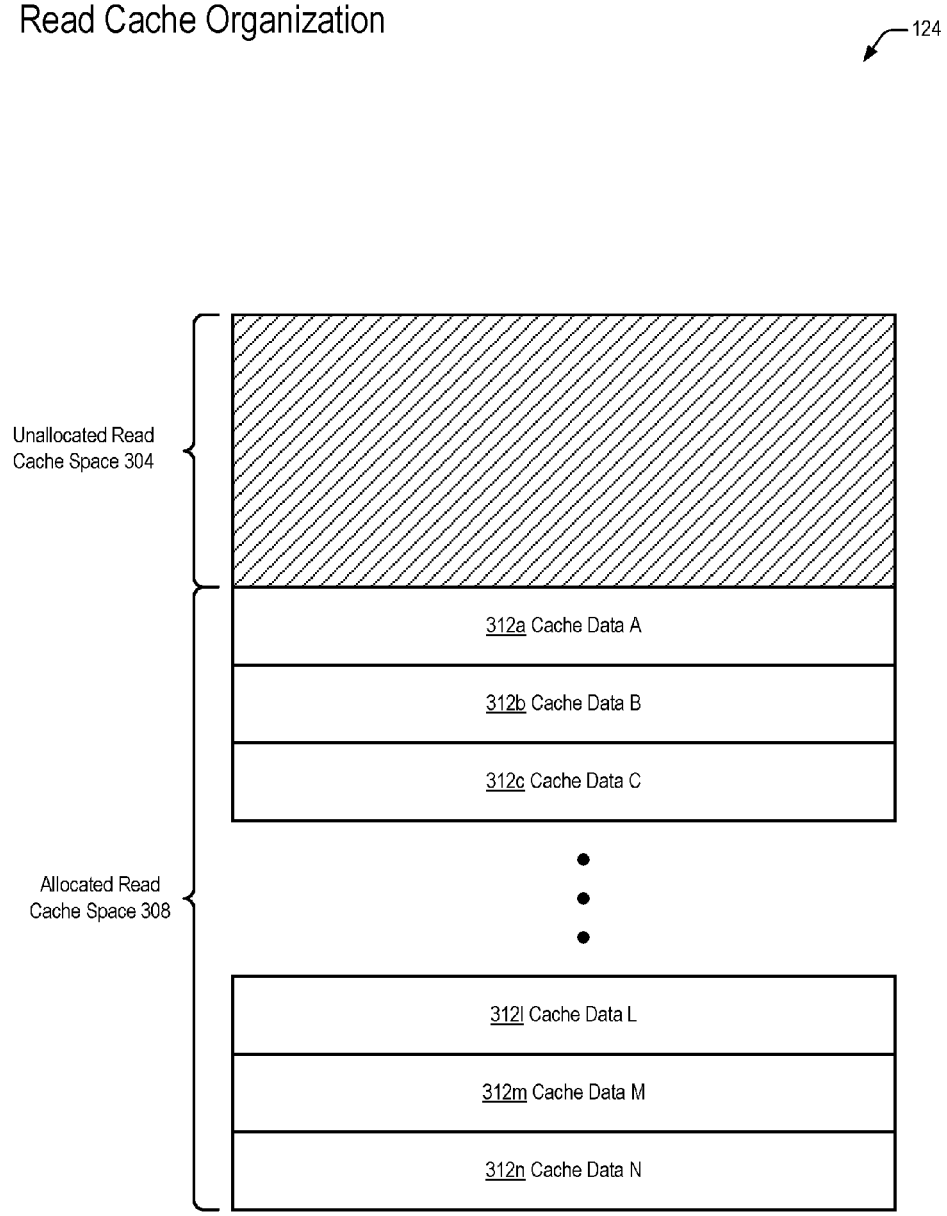

Fig. 4 Storage Controller Metadata
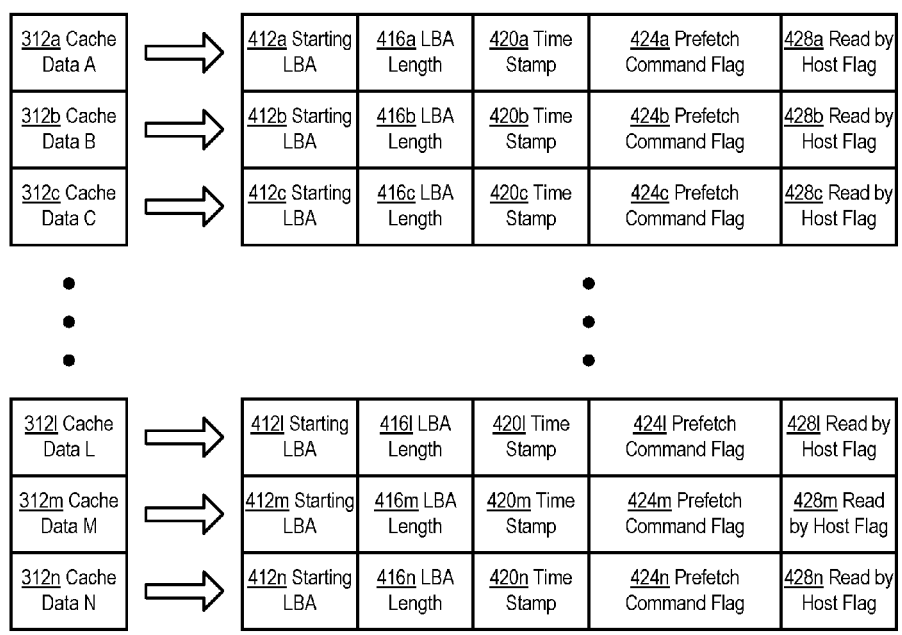

Fig. 5A  Prefetch Data Read Process
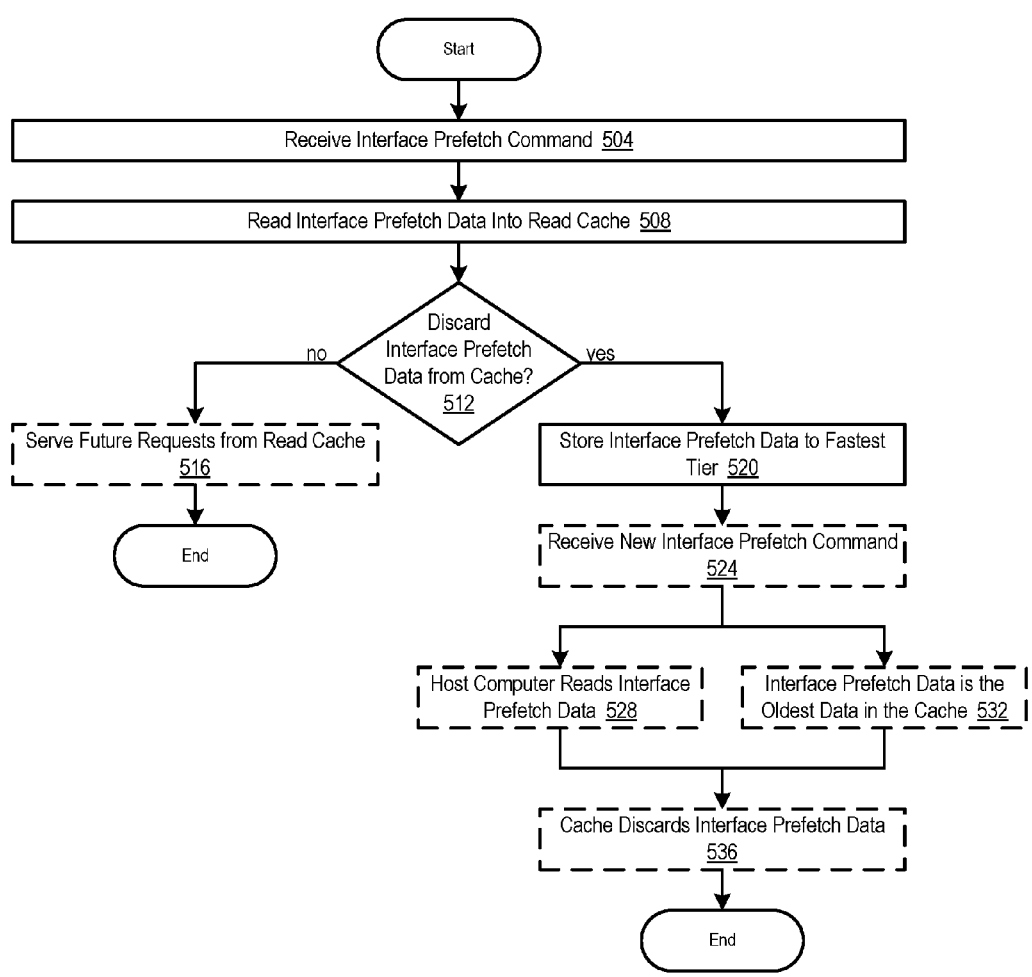

Fig. 5B  Prefetch Data Read Process
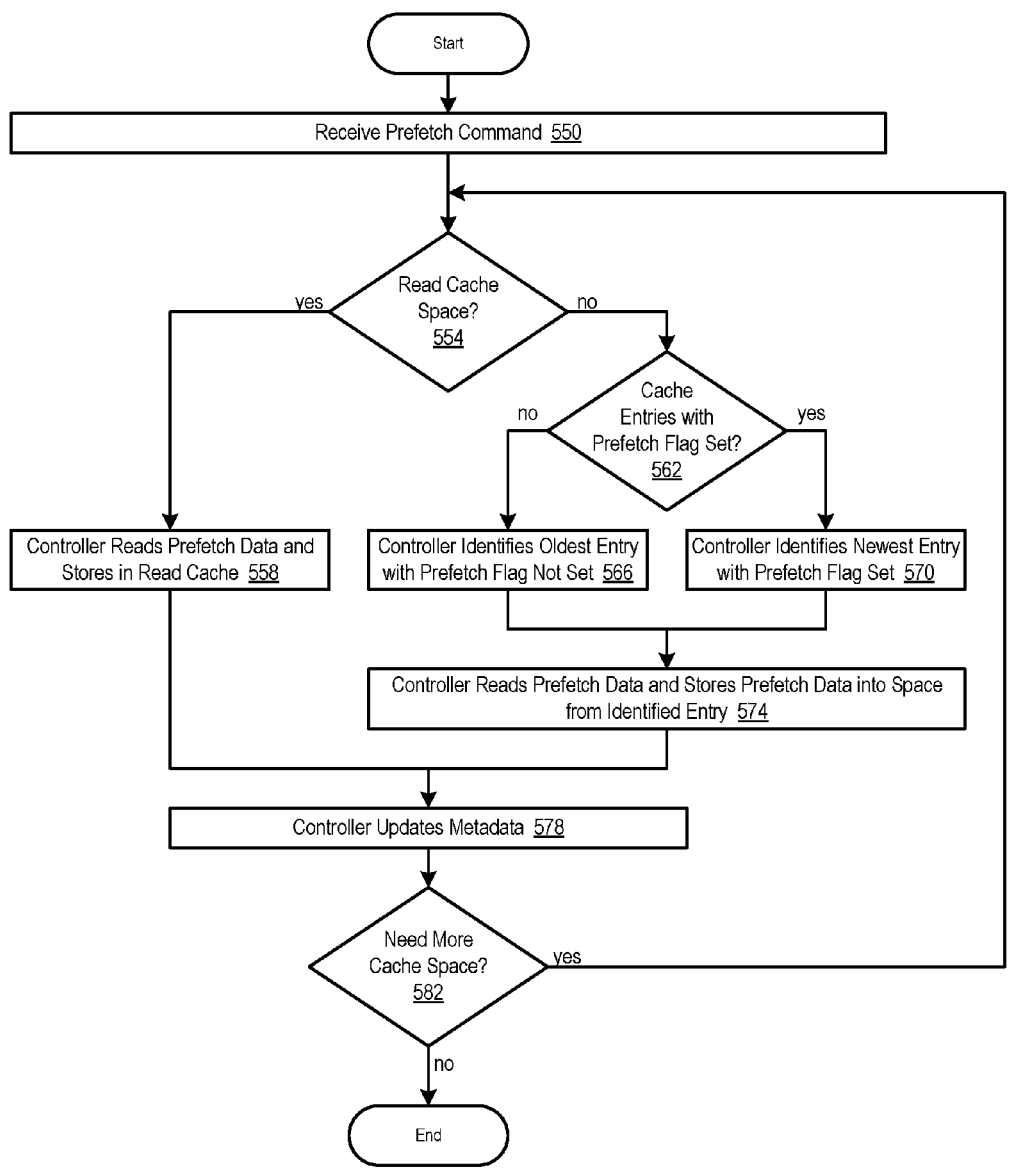

Fig. 6 Prefetch Data Read Process
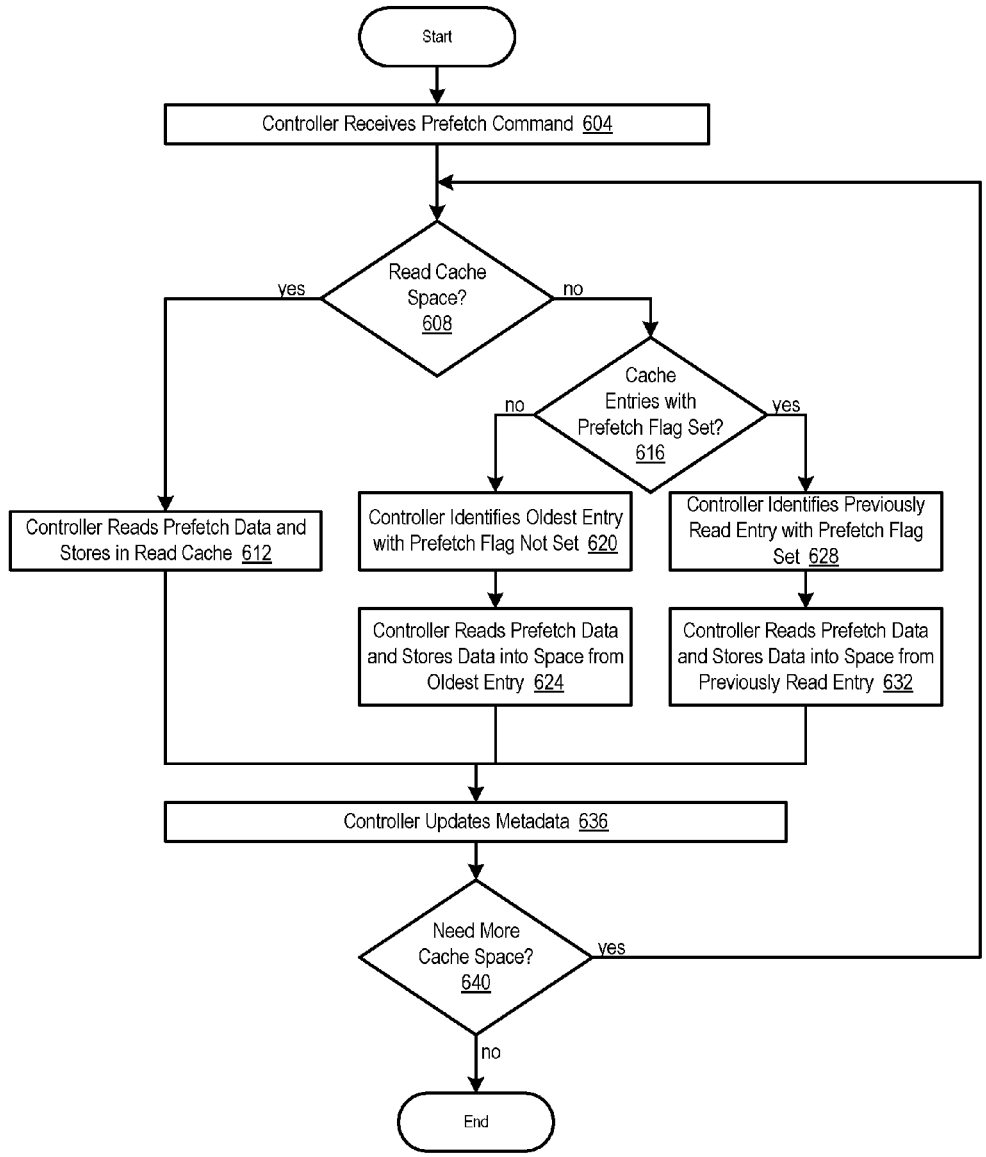

Fig. 7 Prefetch Data Save Process
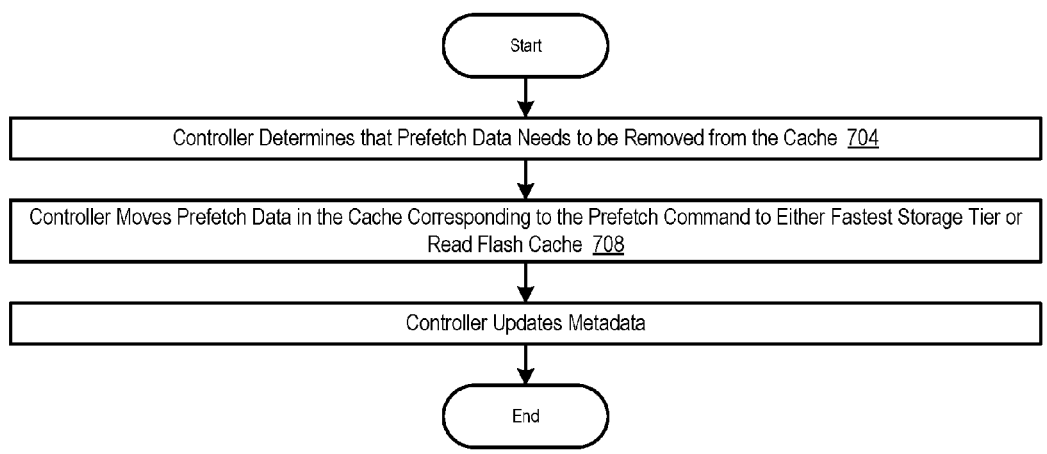

Fig. 8  Prefetch Data Repopulation to Read Cache
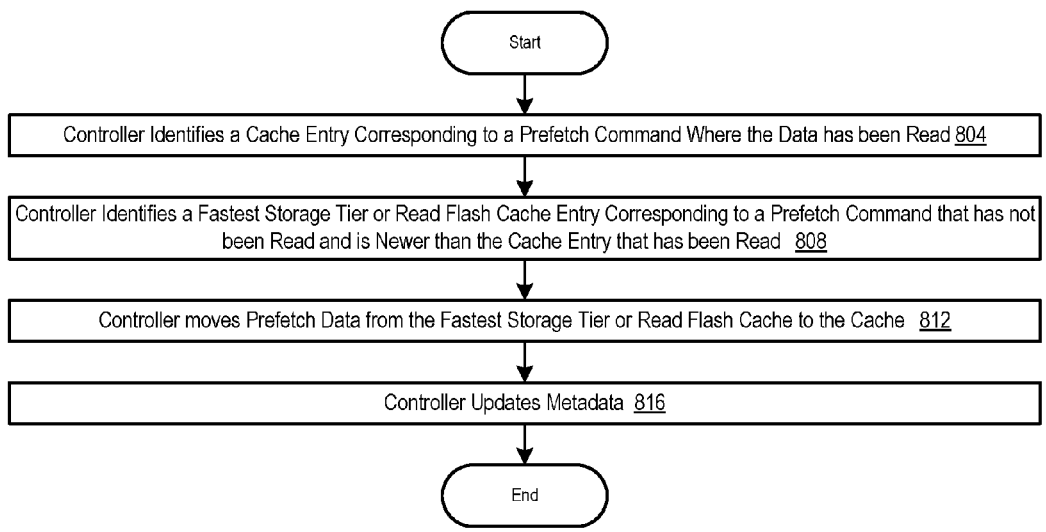

PREFETCH COMMAND OPTIMIZATION FOR TIERED STORAGE SYSTEMS

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Computers utilize a variety of data storage approaches for mass data storage. Various types of data storage devices and organization of groups of data storage devices are used to provide primary storage, near line storage, backup storage, hierarchical storage, and various types of storage virtualization and data replication.

SUMMARY

The present invention is directed to a system. The system includes a storage controller configured to receive a prefetch command from a host interface. The storage controller includes a read cache memory that stores prefetch data in response to the prefetch command and a plurality of storage tiers coupled to the storage controller and providing the prefetch data. The plurality of storage tiers includes a fastest storage tier that stores the prefetch data if the read cache memory discards the prefetch data after storing the prefetch data.

The present invention is also directed to a method. The method includes receiving, by a hardware storage controller, an interface prefetch command, reading, from one or more storage tiers, interface prefetch data corresponding to the interface prefetch command into a read cache, and storing the interface prefetch data to a fastest data storage tier of the one or more storage tiers if the read cache needs to discard the interface prefetch data after storing the interface prefetch data in the read cache.

The present invention is also directed to a storage controller. The storage controller includes circuitry configured to allocate data between a top storage tier and secondary storage tiers, the top storage tier including relatively faster data access media than any of the secondary storage tiers, the circuitry further configured to receive data read and write requests from a host interface. The storage controller also includes circuitry configured to allocate data between a top storage tier and secondary storage tiers, the top storage tier including relatively faster data access media than any of the secondary storage tiers, the circuitry further configured to receive data read and write requests from a host interface. The storage controller also includes a storage controller cache memory to store prefetch data, the storage controller identifying prefetch data in the storage controller cache memory corresponding to target data prefetched from the top or secondary storage tiers, retaining that prefetch data in the storage controller cache memory to serve read requests for the target data from the host interface, and migrating the prefetch data to the top storage tier after receiving a read request for the target data.

Additional features and advantages of embodiments of the present invention will become more readily apparent from the following description, particularly when taken together with the accompanying drawings.

BRIEF DESCRIPTION OF THE DRAWINGS

FIG. 1 is a block diagram illustrating a first storage system embodiment in accordance with the present invention.

FIG. 2A is a block diagram illustrating a second storage system embodiment in accordance with the present invention.

FIG. 2B is a block diagram illustrating a third storage system embodiment in accordance with the present invention.

FIG. 3 is a diagram illustrating a read cache organization in accordance with embodiments of the present invention.

FIG. 4 is a diagram illustrating storage controller metadata in accordance with embodiments of the present invention.

FIG. 5A is a flowchart illustrating a prefetch data read process in accordance with a first embodiment of the present invention.

FIG. 5B is a flowchart illustrating a prefetch data read process in accordance with a second embodiment of the present invention.

FIG. 6 is a flowchart illustrating a prefetch data read process in accordance with a second embodiment of the present invention.

FIG. 7 is a flowchart illustrating a prefetch data save process in accordance with embodiments of the present invention.

FIG. 8 is a flowchart illustrating a prefetch data repopulation process to the read cache in accordance with embodiments of the present invention.

DETAILED DESCRIPTION

The present invention is directed to improvements to data read performance in response to host computer prefetch commands. In addition to generating read and write requests, host computers have the option to issue prefetch commands to storage systems. Host computers generate prefetch commands in order to cause storage systems to migrate specific data from slower storage media to faster storage media in advance of the specific data being requested in a host read request. These host read requests may be sequential, random, or a mix of sequential and random.

Storage tiering is the progression or demotion of data across different tiers of storage devices and media. The movement of data takes place with the help of software or embedded firmware and is assigned to the related media according to performance, capacity or other requirements. More advanced implementations include the ability to define rules and policies that dictate if and when data can be moved between the tiers, and in many cases provides the ability to pin data to tiers permanently or for specific periods of time.

Tiered storage is a form of Hierarchical Storage Management (HSM). However, the term tiered storage accommodates newer forms of real-time performance optimized data migration driven by the proliferation of solid state disks (SSDs), storage class memory and other high performing storage devices.

When host read requests are issued by host computers to data storage systems, in most cases data storage systems will not only read and provide the requested data, but will also prefetch some amount of read data spatially adjacent to the data for the read request. This is called speculative prefetch or read ahead, and it is generally valuable since in many cases the next data a host application would usually request is the spatially adjacent data. However, in some cases it will adversely affect read performance if the read ahead data is not read by a host computer. Storage controllers include read cache memories which are relatively small and high speed memories that can provide data faster in response to read requests than any other storage medium controlled by the storage controller. By speculatively prefetching data to the storage controller read cache, the data will be available as fast as possible to the requesting host computer or application. Complex and sometimes proprietary algorithms in storage controllers manage the data in the read cache, and efficient management is necessary in order to achieve high performance across a variety of operating environments and data workloads.

Host computers do not issue speculative prefetch commands; rather, cache management software or firmware in storage controllers performs the speculative read prefetch operations. However, host computers in general would only issue prefetch commands for data that applications intend to be read sometime in the future. Therefore, data prefetching corresponding to a prefetch command is not speculative since the data will be requested in the future.

What is needed is an efficient way to process prefetch commands from host computers, without compromising read cache management efficiency or necessarily growing the size of read cache memories.

Referring now to FIG. 1, a block diagram illustrating a first storage system 100 embodiment in accordance with the present invention is shown. FIG. 1 illustrates a simple embodiment of the present invention at a system level.

The data storage system 100 includes a host computer 104. Host computer 104 is generally a server, but could also be a desktop or mobile computer. Host computer 104 executes application programs that generate read and write requests to storage controller 112. Host computer 104 communicate through host interface 144 with storage controller 112 over a bus or network including buses such as Small Computer System Interface (SCSI), FiberChannel Arbitrated Loop (FC-AL), Universal System Bus (USB), FIREWIRE, Serial System Architecture (SSA), Serial Attached SCSI (SAS), Serial ATA (SATA), Peripheral Component Interconnect (PCI), Peripheral Component Interconnect Express (PCI Express), INFINIBAND, or any other bus usable by data storage. In another embodiment, a network such as Ethernet, Internet SCSI (iSCSI), FiberChannel, SSA, Enterprise Systems Connection (ESCON), Asynchronous Transfer (ATM), Fibre Connection (FICON), or INFINIBAND may possibly be used.

Host computer 104 may interface with one or more storage controllers 112, although only a single storage controller 112 is illustrated for clarity. In some embodiments, storage controllers 112 are hardware storage controllers 112. In one embodiment, storage controller 112 is a Redundant Array of Independent Disks (RAID) controller. In another embodiment, storage controller 112 is a storage appliance such as a provisioning, virtualization, replication, or backup appliance. Storage controller 112 transfers data to and from storage devices in storage tiers 132, 140. Host computer 104 generates a prefetch command 108, an interface prefetch command 108, a plurality of prefetch commands 108, or a plurality of interface prefetch commands 108 (in some embodiments, a SCSI or other interface prefetch command) to the storage controller 112 in order to cause the storage controller 112 to fetch the prefetch data 136 or interface prefetch data 136 and have it available for fast read access by the host computer 104.

Storage tiers 132, 140 include various types of storage devices, including solid state disks (SSDs), hard disk drives, optical drives, and tape drives. Within a specific storage device type, there may be several sub-categories of storage devices, organized according to performance. For example, hard disk drives may be organized according to cache size, drive RPM (5,400, 7,200, 10,000, and 15,000, for example), queue depth, random transfer rate, or sequential transfer rate. Storage tiers 132, 140 are organized according to some measure of performance, with at minimum a faster storage tier 132 or top storage tier 132, and a slower storage tier 140 or secondary storage tier 140.

The faster storage tier 132 is characterized as having generally faster read data performance than the slower storage tier 140. Specifically, the faster storage tier 132 will have faster read performance in at least one of the following areas: read access time, data read bandwidth, sequential read latency, and random read latency. In the preferred embodiment, storage tiers 132, 140 are organized into one of the fault-tolerant RAID levels. However, in other embodiments one or more storage tiers 132, 140 may be organized differently.

Storage controller 112 includes a CPU or processor 116, which executes program instructions stored in a memory 120 coupled to the CPU 116. CPU 116 includes any processing device suitable for executing storage controller 112 programs, such as Intel x86-compatible processors, embedded processors, mobile processors, and/or RISC processors. CPU 116 may include several devices including field-programmable gate arrays (FPGAs), memory controllers, North Bridge devices, and/or South Bridge devices.

Memory 120 may be one or more forms of volatile memory 120, non-volatile memory 120, or a combination of both volatile and non-volatile memories 120. In some embodiments, the memory 120 includes firmware which includes program instructions that CPU 116 fetches and executes, including program instructions for the processes of the present invention. Examples of non-volatile memory 120 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 120 stores various data structures and user data. Examples of volatile memory 120 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory.

Memory 120 includes a read data cache 124, also known as a read cache 124 or read cache memory 124, and in some embodiments a write data cache, also known as a write cache, which provide improved read and write performance, respectively, to the host computer 104. The write cache is not shown for the purposes of clarity since it is not involved in the operation of the present invention but should be understood to be generally present in most embodiments.

Storage controller 112 is coupled to storage tiers 132, 140, each of which includes one or more storage devices. Each storage tier 132, 140 is generally organized as a fault-tolerant grouping of similar performing storage devices and is generally organized in a RAID (redundant array of independent disks) configuration known in the art. Prefetch data 136a is read from storage tiers 132, 140 into the read cache 124, where it can be provided in response to host read requests much faster than directly from the storage devices. In response to receiving the prefetch command 108 from the host computer 104, the storage controller 112 fetches prefetch data 136a corresponding to the prefetch command 108 from the storage tiers 132, 140 and stores the prefetch data 136a in the read cache 124.

At some time in the future, under conditions to be discussed later in the present application, the storage controller 112 migrates the prefetch data 136b from the read cache 124 to the fastest storage tier 132. This is done instead of more commonly discarding prefetch data as read caches 124 commonly do for non-prefetch command 108 data. Additionally, in some embodiments, prefetch data 136c is repopulated from the fastest storage tier 132 back to the read cache 124. This is discussed in more detail with respect to FIG. 8. It should be noted that prefetch data 136a, 136b, and 136c all represent the exact same physical data, and that the "a", "b", or "c" identifiers simply designate where the data is being moved from/to.

It should be understood that storage controller 112 may be functionally organized in countless different functional organizations and architectures without diverting from the scope or operation of the present invention.

Referring now to FIG. 2a, a block diagram illustrating a second storage system 200 embodiment in accordance with the present invention is shown. FIG. 2a adds additional detail and some options to the storage system 100 of FIG. 1.

FIG. 2A illustrates three host computers 104, identified as host computer 104a, host computer 104b, and host computer 104c. Each of the host computers 104 may be the same type of host computer 104, servers, for example, or they may each be different. Also, the invention isn't limited to any number of host computers 104.

In most cases, multiple host computers 104 communicate with a storage controller 212 through a bus or network 204. Buses and networks 204 were discussed with reference to FIG. 1 and may include any bus or network 204 used for data movement. Each of the host computers 104 may generate any number of prefetch commands 108 or read or write requests 208. Read or write requests 208 address target data in any of the storage tiers 132, 140.

Storage controller 212 may be organized in any fashion, and includes a CPU 116, a memory 120 including a read cache 124, and a metadata storage area 216 for storing various parameters used by processes of the present invention and described in more detail herein.

Storage system 200 may include any number of storage tiers, and as illustrated includes a fastest storage tier 132 and two slower storage tiers 140, identified as slower storage tier 140a and slower storage tier 140b. For the purposes of the present invention, it is not necessary to distinguish between any of the slower storage tiers 140, but only between the fastest storage tier 132 and one or more slower storage tiers 140. It should be noted that in most cases, the size of the slower storage tiers 140 is typically much larger than the size of the fastest storage tier 132. Because of this, it is most likely that prefetch data 136a will be sourced from a slower storage tier 140a, 140b rather than from the fastest storage tier 132. However, that is not a requirement and the prefetch data 136a will be sourced from whatever tier 132, 140 the data is stored within. All tiers 132, 140 controlled by the storage controller 112 are considered a plurality of storage tiers 132, 140.

At some time in the future, under conditions to be discussed later in the present application, the storage controller 112 migrates the prefetch data 136b from the read cache 124 to the fastest storage tier 132. This is done instead of more commonly discarding prefetch data as read caches 124 commonly do for non-prefetch command 108 data. Additionally, in some embodiments, prefetch data 136c is repopulated from the fastest storage tier 132 back to the read cache 124. This is discussed in more detail with respect to FIG. 8. It should be noted that prefetch data 136a, 136b, and 136c all represent the exact same physical data, and that the "a", "b", or "c" identifiers simply designate where the data is being moved from/to.

Referring now to FIG. 2B, a block diagram illustrating a third storage system 232 embodiment in accordance with the present invention is shown. The third storage system embodiment 232 is similar to the second embodiment illustrated in FIG. 2A, but includes some additional features that may be present.

As discussed previously with respect to FIG. 1, storage tiers 132, 140 are generally organized as fault-tolerant storage arrays and are usually in a RAID configuration. This requires multiple storage devices and in some cases, more than 10 storage devices. The storage devices used in the fastest storage tier 132 are usually the fastest currently available storage devices and in current technology would be solid state disks (SSDs). SSDs do not require spinning media and head seeks to access data, and are made up of arrays of semiconductor storage devices instead. However, SSDs may be much more expensive than hard disks, for example, especially on a price per unit of storage basis. The number of storage devices and need for redundant storage devices to achieve fault tolerance contribute to a further high cost of a fastest storage device tier 132.

Because of the high cost of a fastest storage device tier 132, in some embodiments a fastest storage device tier 132 is not present, and instead a different storage device architecture using a read flash cache 220 is required. A read flash cache 220 is one or more SSD storage devices that functions as a Level 2 cache between a read cache 124 in the storage controller 112 and the slower storage tiers 140. The read flash cache 220 is generally not fault tolerant, in order to reduce costs, and generally includes fewer physical storage devices than the fastest storage tier 132. A storage system 232 may include an internal read flash cache 220a or an external read flash cache 220b, but not both. If a read flash cache 220 is present, prefetch data 136b will be stored in the read flash cache 220 instead of a fastest storage tier 132.

At some time in the future, under conditions to be discussed later in the present application, the storage controller 112 migrates the prefetch data 136b from the read cache 124 to the read flash cache 220a, 220b. This is done instead of more commonly discarding prefetch data as read caches 124 commonly do for non-prefetch command 108 data. Additionally, in some embodiments, prefetch data 136c is repopulated from the read flash cache 220a, 220b back to the read cache 124. This is discussed in more detail with respect to FIG. 8. It should be noted that prefetch data 136a, 136b, and 136c all represent the exact same physical data, and that the "a", "b", or "c" identifiers simply designate where the data is being moved from/to.

Referring now to FIG. 3, a diagram illustrating a read cache 124 organization in accordance with embodiments of the present invention is shown. Read cache 124 stores read data that was requested from a conventional read request 208, conventional read prefetches caused by conventional read requests 208, and read prefetches 136a caused by prefetch commands 108. Because a read cache 124 is relatively small (1-8 GB today is a common size) compared to the size of primary data storage resources including storage tiers 132, 140, managing the efficiency of the read cache 124 is of prime importance. When a read cache 124 is initially used, there is no data present and all space in the read cache 124 is unallocated space 304. As more data is read and prefetched, the read cache 124 fills up and the unallocated space 304 is reduced.

Data that fills the read cache 124 is allocated space 308. Each item of data in the read cache 124 may be identified as cache data 312. The number of data items 312 in the read cache 124 depends on the size of the read cache 124 and the size of each of the data items 312. In the illustration of FIG. 3, there are n cache data items 312, identified as cache data A 312a through cache data N 312n.

Referring now to FIG. 4, a diagram illustrating storage controller metadata 216 in accordance with embodiments of the present invention is shown. Storage controller metadata 216 does not include cache data items 312, but rather includes various data structures and parameters used by the storage controller 112 to manage the read cache 124. The arrows in FIG. 4 illustrate a correspondence between read cache data items 312 and metadata items 216.

Each host read request 208 and prefetch command 108 includes both a starting Logical Block Address (LBA) 412 and an LBA length 416. Any data stored in read cache 124 needs to have both the starting Logical Block Address (LBA) 412 and an LBA length 416 stored within the metadata 216. It is also important to keep track of when new data 312 is added to the read cache 124 by recording a time stamp 420 for each data item 312. The time stamp 420 is used to determine the oldest data items 312 in the read cache 124, in order to identify which data items 312 and corresponding metadata 216 should be removed/discarded.

In order to provide efficient read cache 124 management for prefetch commands 108 or interface prefetch commands 108, two additional items are stored in metadata 216 for each data item 312. A prefetch command flag 424 is set to identify if the metadata 216 entry reflects a prefetch command 108. This flag 424 is used to identify metadata 216 items that need to be preserved to either the fastest storage tier 132 or a read flash cache 220, and identifies first data in the present claims. Data in the read cache 124 that was not prefetched in response to a prefetch command 108 is considered second data in the present claims. Identifying prefetch data 136a in the read cache 124 prevents the prefetch data 136a from being overwritten in the read cache 124 according to predetermined cache prefetch policies.

Finally, each metadata 216 entry also includes a read by host flag 428 identifying if the data item 312 corresponding to the flag 428 has previously been read by a host computer 104. In some embodiments of the present invention, data items 312 that have previously been read by a host computer 104 do not need to be preserved in the read cache 124, or possibly anywhere else.

Although the metadata items shown in FIG. 4 apply to the read cache 124, it should be understood that in most cases, similar metadata items are stored for the fastest storage tier 132 or the read flash cache 220, whichever happens to be present. Therefore, in discussions such as with respect to FIG. 8, where prefetch data 136c is being repopulated from the fastest storage tier 132 or the read flash cache 220 to the read cache 124, time stamps 420, prefetch command flags 424, and read by host flags 428 are compared and is used to identify a specific entry to move or relocate.

Referring now to FIG. 5A, a flowchart illustrating a prefetch data 136a read process in accordance with a first embodiment of the present invention is shown. Flow begins at block 504.

At block 504, the storage controller 112 receives an interface prefetch command 108 from a host computer 104. Flow proceeds to block 508.

At block 508, the storage controller 112 reads interface prefetch data 136a into the read cache memory 124 of the storage controller 112. Flow proceeds to decision block 512.

At decision block 512, the storage controller 112 determines if interface prefetch data 136a should be discarded/removed from the read cache memory 124. Interface prefetched data 136a needs to be discarded/removed from the read cache memory 124 if there is other data that is more desirable to store in the read cache memory 124. For example, if the interface prefetch data 136a has already been read by a host computer 104, it is unlikely in most cases that the interface prefetch data 136a will be read again. In such a case, it is advantageous to replace the interface prefetch data 136a with other data that is more likely to be read in the future. If the interface prefetch data 136a should be discarded/removed from the read cache memory 124, then flow proceeds to block 520. If interface prefetch data 136a should not be discarded/removed from the read cache memory 124, then flow proceeds to optional block 516.

At optional block 516, the storage controller 112 serves other future read requests 208 from the read cache memory 124. Flow ends at optional block 516.

At block 520, the storage controller 112 stores the interface prefetch data 136b to the fastest storage tier 132 or a read flash cache 220a, 220b. Although this begins the process of removing the interface prefetch data 136b from the read cache memory 124, it saves the data in the next fastest read data media—which is either the fastest storage tier 132 or a read flash cache 220. Therefore, read performance for the interface prefetch data 136b will remain generally fast. Flow proceeds to optional block 524.

At optional block 524, the storage controller 112 receives a new interface prefetch command 108. The new interface prefetch command requests prefetch for different interface prefetch data 136a than the original interface prefetch command 108. Flow proceeds to optional blocks 528 and 532.

At optional block 528, a host computer 104 reads the original interface prefetch data 136a from the read cache memory 124. Flow proceeds to optional block 536.

At optional block 532, the storage controller 112 identifies the original interface prefetch data 136a as the oldest data in the read cache memory 124. Flow proceeds to optional block 536.

At optional block 536, the read cache memory 124 discards the original interface prefetch data 136a. Flow ends at optional block 526.

Referring now to FIG. 5B, a flowchart illustrating a prefetch data 136a read process in accordance with a first embodiment of the present invention is shown. Flow begins at block 550.

At block 550, the storage controller 112 receives a prefetch command 108 from a host computer 104. Flow proceeds to decision block 554.

At decision block 554, the storage controller 112 determines if there is sufficient space in the read cache 124 to store the prefetch data 136a. In some cases, there may be some empty/invalidated/unallocated space in read cache 124, but not enough space to store the prefetch data 136a. In other cases, there may be no empty space. If there is sufficient space to store the prefetch data 136a, flow proceeds to block 558. If there is not sufficient space to store the prefetch data 136a, flow proceeds to decision block 562.

At block 558, the storage controller 112 reads prefetch data 136a corresponding to the prefetch command 108 from the storage tiers 132, 140 or read flash cache 220 and stores the prefetch data 136a corresponding to the prefetch command 108 in the read cache 124. Although in most cases the prefetch data 136a will be read from a slower storage tier 140, in some cases the data may be read from the fastest storage tier 132. Flow proceeds to block 578.

At decision block 562, the storage controller 112 determines if there are any read cache 124 entries with the prefetch command flag 424 set. The prefetch command flag 424 identifies the corresponding cache entry as caused by a prefetch command 108. The present invention uses the prefetch command flag 424 in order to decide when the read cache 124 data should be preserved in a fast storage medium 132, 220. If there are any read cache 124 entries with the prefetch command flag 424 set, flow proceeds to block 570. If there are not any read cache 124 entries with the prefetch command flag 424 not set, flow proceeds to block 566.

At block 566, the storage controller 112 identifies an oldest entry with the prefetch command flag 424 not set. The oldest entry is determined by the time stamp 420, where the earliest time stamp 420 with the prefetch command flag 424 not set is the oldest entry. Flow proceeds to block 574.

At block 570, the storage controller 112 identifies a newest entry with the prefetch command flag 424 set. The newest entry is determined by the time stamp 420, where the latest time stamp 420 with the prefetch command flag 424 set is the newest entry. With data corresponding to a prefetch command 108, the oldest data in the read cache 124 is the most likely to be read first, and the newest data is the most likely to be read last. Therefore, read performance will be optimized if the newest data corresponding to a prefetch command 108 is migrated to the fastest storage tier 132 or read flash cache 220, rather than the oldest data. Flow proceeds to block 574.

At block 574, the storage controller 112 reads prefetch data 136a corresponding to the prefetch command 108 and stores prefetch data 136a corresponding to the prefetch command 108 into space freed up from the oldest entry identified in block 566 or the newest entry identified in block 570. Flow proceeds to block 578.

At block 578, the storage controller 112 updates the metadata 216 with Logical block address (LBA starting address 412, LBA length 416), time stamp 420, and prefetch command flag 424. The read by host flag 428 would automatically be reset at this point since there has been no opportunity for a host computer 104 to read the corresponding cache data 312. Flow proceeds to decision block 582.

At decision block 582, the storage controller 112 determines if more read cache 124 space is needed to store the prefetch data 136a. At this point, it is possible that only partial prefetch data 136a has been stored in the read cache 124, and additional read cache 124 space needs to be freed up. If more read cache 124 space needs to be freed up, then flow proceeds to decision block 508. If no more read cache 124 space needs to be freed up, then flow ends at decision block 582.

Referring now to FIG. 6, a flowchart illustrating a prefetch data 136a read process in accordance with a second embodiment of the present invention is shown. Flow begins at block 604.

At block 604, the storage controller 112 receives a prefetch command 108 from a host computer 104. Flow proceeds to decision block 608.

At decision block 608, the storage controller 112 determines if there is sufficient space in the read cache 124 to store the prefetch data 136a. In some cases, there may be some empty/invalidated/unallocated space in read cache 124, but not enough space to store the prefetch data 136a. In other cases, there may be no empty space. If there is sufficient space to store the prefetch data 136a, flow proceeds to block 612. If there is not sufficient space to store the prefetch data 136a, then flow proceeds to decision block 616.

At block 612, the storage controller 112 reads prefetch data 136a corresponding to the prefetch command 108 from the storage tiers 132, 140 or read flash cache 220 and stores the prefetch data 136a corresponding to the prefetch command 108 in the read cache 124. Although in most cases the prefetch data 136a will be read from a slower storage tier 140, in some cases the data may be read from the fastest storage tier 132. Flow proceeds to block 636.

At decision block 616, the storage controller 112 determines if there are any read cache 124 entries with the prefetch command flag 424 set. The prefetch flag 424 identifies the corresponding cache entry as caused by a prefetch command 108. The present invention uses the prefetch command flag 424 in order to decide when the read cache 124 data should be preserved in a fast storage medium 132, 220. If there are any read cache 124 entries with the prefetch command flag 424 set, flow proceeds to block 628. If there are not any read cache 124 entries with the prefetch command flag 424 set, flow instead proceeds to block 620.

At block 620, the storage controller 112 identifies an oldest entry with the prefetch command flag 424 not set. The oldest entry is determined by the time stamp 420, where the earliest time stamp 420 with the prefetch command flag 424 not set is the oldest entry. Flow proceeds to block 624.

At block 624, the storage controller 112 reads prefetch data 136a corresponding to the prefetch command 108 from the storage tiers 132, 140 or read flash cache 220 and stores the prefetch data 136a corresponding to the prefetch command 108 into space freed up from the oldest entry in block 620. Flow proceeds to block 636.

At block 628, the storage controller 112 identifies a previously read entry 428 with the prefetch command flag 424 set. In one embodiment, the storage controller 112 identifies a previously read entry 428 with the lowest LBA starting address 412. In another embodiment, the storage controller 112 identifies a previously read entry 428 with the highest LBA starting address 412. In yet another embodiment, the storage controller 112 identifies a previously read entry 428 with the latest time stamp 420. Flow proceeds to block 632.

At block 632, the storage controller 112 reads prefetch data 136a corresponding to the prefetch command 108 from the storage tiers 132, 140 or read flash cache 220 and stores the prefetch data 136a corresponding to the prefetch command 108 into space freed up from the previously read entry identified in block 628. Flow proceeds to block 636.

At block 636, the storage controller 112 updates the metadata 216 with Logical block address (LBA starting address 412, LBA length 416), time stamp 420, and prefetch command flag 424. The read by host flag 428 would automatically be reset at this point since there has been no opportunity for a host computer 104 to read the corresponding cache data 312. Flow proceeds to decision block 640.

At decision block 640, the storage controller 112 determines if more read cache 124 space is needed to store the prefetch data 136a. At this point, it is possible that only partial prefetch data 136a has been stored in the read cache 124, and additional read cache 124 space needs to be freed up. If more read cache 124 space needs to be freed up, then flow proceeds to decision block 608. If no more read cache 124 space needs to be freed up, then flow ends at decision block 640.

Referring now to FIG. 7, a flowchart illustrating a prefetch data 136b data save process in accordance with embodiments of the present invention is shown. Flow begins at block 704. The process of FIG. 7 is invoked any time read cache 124 algorithms determine that prefetch data 136 needs to be removed from the read cache 124. The process of FIG. 7 may be invoked in response to a read request 208, a conventional read prefetch associated with a read request 208, or in response to receiving a prefetch command 108. In the latter case, the process of FIG. 7 would occur between blocks 570 and 574 of FIG. 5B or between blocks 628 and 632 of FIG. 6. Flow begins at block 704.

At block 704, the storage controller 112 determines that data corresponding to the prefetch command 108 needs to be removed from the read cache 124. Flow proceeds to block 708.

At block 708, the storage controller 112 moves prefetch data 136b in the read cache 124 corresponding to the prefetch command 108 to either the fastest storage tier 132 or a read flash cache 220. Flow proceeds to block 712.

At block 712, the storage controller 112 updates metadata 216 to reflect movement of prefetch data 136b corresponding to the prefetch command 108. Flow ends at block 712.

Although the process steps of the present invention describe the storage controller 112 performing the actions, it is understood by one of ordinary skill in the art that a CPU or processor 116 generally performs these steps. However, in other embodiments, one or more processors, state machines, programmable logic devices, or other devices may perform these steps.

Referring now to FIG. 8, a flowchart illustrating a prefetch data 136c repopulation process to the read cache 124 in accordance with embodiments of the present invention is shown. In some cases, prefetch data 136b is migrated from the read cache 124 to either the fastest storage tier 132 or the read flash cache 220 before the prefetch data 136b has been read. In such cases, it may be beneficial to repopulate the read cache 124 with the unread prefetch data 136c in the fastest storage tier 132 or the read flash cache 220. The read cache 124 in most embodiments will provide improved read performance compared to the fastest storage tier 132 or the read flash cache 220. Flow begins at block 804.

At block 804, the storage controller 112 identifies a read cache 124 entry corresponding to a prefetch command 108 where the data has been read. Read by host flag 428 identifies read cache 124 entries where the data has been previously read. Flow proceeds to block 808.

At block 808, the storage controller 112 identifies a fastest storage tier 132 or read flash cache 220 entry corresponding to a prefetch command 108 that has not been read and is newer than the read cache 124 entry identified in block 804. A newer entry is identified by comparing the time stamp 420 for the read cache 124 metadata and the time stamp 420 for the fastest storage tier 132 or read flash cache 220. Flow proceeds to block 812.

At block 812, the storage controller 112 moves prefetch data 136c in the fastest storage tier 132 or read flash cache 220 to the read cache 124. Prefetch data 136c is referred to as third data in the present claims. Flow proceeds to block 816.

At block 816, the storage controller 112 updates metadata 216 as well as metadata for the fastest storage tier 132 or read flash cache 220 to reflect movement of prefetch data 136c corresponding to the prefetch command 108. Flow ends at block 816.

In one embodiment, the process of FIG. 8 is run periodically within the storage controller 112 in order to see if any repopulation optimizations can be made. In one embodiment, the process of FIG. 8 is run repeatedly until there are no more cache entries that meet the time stamp or previously read criteria. In another embodiment, the process of FIG. 8 is run every time there is a read cache 124 entry corresponding to a prefetch command 108 that has just been read by a host computer 108.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A system comprising:
a host computer;
a storage controller configured to receive a prefetch command from the host computer, the storage controller comprising:
a read cache memory that stores prefetch data in response to the prefetch command; and
metadata comprising a starting Logical Block Address, a Logical Block Address length for the prefetch command, and one or more of a time stamp, a prefetch command flag, and a read by host flag; and
a plurality of storage tiers, each comprising storage devices having different performance characteristics than others of the plurality of storage tiers, coupled to the storage controller and providing the prefetch data, the plurality of storage tiers comprising:
a fastest storage tier that stores the prefetch data from the read cache memory in response to the storage controller determines the prefetch data should be discarded from the read cache memory, the storage controller further configured to transfer the prefetch data between the read cache memory and the fastest storage tier.

2. The system of claim 1, wherein the plurality of storage tiers comprises at least one storage tier having lower data read performance than the fastest storage tier, wherein the prefetch command is a small system computer interface (SCSI) prefetch command.

3. The system of claim 1, wherein the fastest data storage tier comprises solid state device (SSD) storage devices configured to be fault-tolerant.

4. The system of claim 3, wherein the SSD storage devices are configured in a redundant array of independent disks (RAID) configuration that continues to read and write data after one or more SSD storage devices has failed.

5. The system of claim 1, wherein the storage controller receives a plurality of prefetch commands comprising the prefetch command and the storage controller further comprises:
metadata storage comprising identifiers of first data in the read cache memory that was prefetched in response to the storage controller receives the plurality of prefetch commands.

6. The system of claim 5, wherein in response to the read cache memory is full when the storage controller receives the prefetch command, the storage controller identifies second data in the read cache memory that was not prefetched in response to any of the plurality of prefetch commands and overwrites the second data with the prefetch data.

7. The system of claim 5, wherein in response to the read cache memory is full when the storage controller receives the prefetch command and all data in the read cache memory is first data, the storage controller identifies newest first data, transfers the newest first data to the fastest storage tier, and writes the prefetch data into a read cache memory area where the newest first data was stored.

8. The system of claim 5, wherein the metadata storage further comprises:
identifiers of first data in the read cache memory that was previously read, wherein in response to the read cache memory is full when the storage controller receives the prefetch command and all data in the read cache memory is first data, the storage controller overwrites first data that was previously read with the prefetch data.

9. The system of claim 8, wherein the prefetch data is transferred over a host interface from the read cache memory and in response, the storage controller identifies third data in the fastest storage tier corresponding to a prefetch command that has not been read over the host interface and transfers the third data to the read cache memory.

10. A method comprising:
receiving, by a hardware storage controller, an interface prefetch command from a host, the hardware storage controller comprising metadata comprising a starting Logical Block Address, a Logical Block Address length for the interface prefetch command, and one or more of a time stamp, a prefetch command flag, and a read by host flag;
reading, from one or more storage tiers, interface prefetch data corresponding to the interface prefetch command into a read cache, the one or more storage tiers each comprising storage devices having different performance characteristics than others of the one or more storage tiers; and
storing, by the hardware storage controller, the interface prefetch data to a fastest storage tier of the one or more storage tiers in response to the storage controller determining the interface prefetch data should be discarded from the read cache.

11. The method of claim 10, wherein prior to storing the interface prefetch data to the fastest storage tier, the method comprising:
storing the interface prefetch data to a read flash cache, wherein the read flash cache functions as a level 2 read cache between the read cache and the storage tiers other than the fastest storage tier, wherein the read flash cache comprises only read data.

12. The method of claim 11, wherein after storing the interface prefetch data to the read flash cache, the method comprising:
freeing up space in the read cache corresponding to the interface prefetch data to provide unallocated space for new interface prefetch data in the read cache.

13. The method of claim 10, wherein the method further comprising:
preserving the interface prefetch data in the read cache after the host has read the interface prefetch data as long as the interface prefetch data is not the oldest data in the read cache.

14. The method of claim 13, wherein the one or more storage tiers comprises at least one storage tier having slower read access time than the fastest storage tier and the interface prefetch command is a small computer system interface (SCSI) prefetch command.

15. The method of claim 10, wherein the storage controller determining the interface prefetch data should be discarded from the read cache comprises a new interface prefetch command has been received by the storage controller and one of:
the host has previously read the interface prefetch data from the read cache; and
the interface prefetch data is the oldest data in the read cache.

16. The method of claim 15, wherein a plurality of interface prefetch commands comprises the interface prefetch command.

17. The method of claim 16, further comprising:
maintaining, by the storage controller, identifiers of interface prefetch data in the read cache that was prefetched in response to the storage controller receiving any of the plurality of interface prefetch commands and interface prefetch data corresponding to any of the plurality of interface prefetch commands that was previously read by the host.

18. A storage controller comprising:
circuitry configured to allocate data between a top storage tier and secondary storage tiers, the top storage tier comprising relatively faster data access media than any of the secondary storage tiers, the circuitry further configured to receive data read and write requests from a host computer, each of the top and secondary storage tiers comprising storage devices having different performance characteristics than others of the top and secondary storage tiers;
a storage controller cache memory to store prefetch data, the storage controller identifying prefetch data in the storage controller cache memory corresponding to target data prefetched from the top or secondary storage tiers, retaining the prefetch data in the storage controller cache memory to serve read requests for the target data from the host computer, and migrating the prefetch data to the top storage tier in response to receiving a read request for the target data; and
metadata comprising a starting Logical Block Address, a Logical Block Address length for the prefetch data, and one or more of a time stamp, a prefetch command flag, and a read by host flag.

19. The storage controller of claim 18, comprising a host interface comprising a small computer system interface ("SCSI") protocol or alternative interface protocol.

20. The storage controller of claim 18, wherein identifying prefetch data prevents the prefetch data from being overwritten in the storage controller cache memory according to predetermined cache prefetch policies.

* * * * *